United States Patent
Ishigaki et al.

(10) Patent No.: US 7,247,686 B2
(45) Date of Patent: Jul. 24, 2007

(54) SOLID COCATALYST COMPONENT FOR OLEFIN POLYMERIZATION AND CATALYST SYSTEM THEREOF

(75) Inventors: Satoru Ishigaki, Kanagawa (JP); Shinji Hinokuma, Tokyo (JP)

(73) Assignees: Basell Polyolefine GmbH, Wesseling (DE), part interest; SunAllomer Ltd., Oita (JP), part interest ( * ) Notice: Subject to any disclaimer, the term of this patent is extended or adjusted under 35 U.S.C. 154(b) by 13 days.

(21) Appl. No.: 10/493,089

(22) PCT Filed: Oct. 17, 2002

(86) PCT No.: PCT/EP02/11729

§ 371 (c)(1),
(2), (4) Date: Apr. 19, 2004

(87) PCT Pub. No.: WO03/035708

PCT Pub. Date: May 1, 2003

(65) Prior Publication Data

US 2005/0009689 A1    Jan. 13, 2005

(30) Foreign Application Priority Data

Oct. 19, 2001   (JP) ............................. 2001-322615

(51) Int. Cl.
*C07F 7/08* (2006.01)
*C07F 5/02* (2006.01)
*C08F 4/02* (2006.01)
*C08F 4/60* (2006.01)

(52) U.S. Cl. .................. 526/134; 526/132; 526/160; 526/128; 526/129; 502/103; 502/120; 556/402; 568/1

(58) Field of Classification Search ............... 526/128, 526/129, 133, 160, 165, 132, 134; 502/120, 502/152, 158, 202, 103; 556/402; 568/1
See application file for complete search history.

(56) References Cited

U.S. PATENT DOCUMENTS

| 5,294,685 A | 3/1994 | Watanabe et al. ........... 526/134 |
| 5,427,991 A | 6/1995 | Turner ........................ 502/103 |
| 5,455,366 A | 10/1995 | Rohrmann et al. ............ 556/8 |
| 5,770,753 A | 6/1998 | Kuber et al. .................. 556/11 |
| 5,939,347 A | 8/1999 | Ward et al. .................. 502/104 |
| 6,057,408 A | 5/2000 | Winter et al. ................ 526/160 |
| 6,252,097 B1 | 6/2001 | Sugano et al. ................ 556/11 |
| 6,423,795 B1 | 7/2002 | Canich et al. .............. 526/160 |

FOREIGN PATENT DOCUMENTS

| EP | 0775707 | 5/1997 |
| JP | 296306 | 10/1992 |
| JP | 100579 | 4/1994 |
| JP | 184179 | 7/1994 |
| JP | 345809 | 12/1994 |
| JP | 176222 | 7/1997 |
| JP | 226712 | 8/1998 |
| JP | 279588 | 10/1998 |
| WO | 9628480 | 9/1996 |
| WO | 0200666 | 1/2002 |

OTHER PUBLICATIONS

Akira Akimoto, "High Function and Characterization of Polyethylene made by using Metallocene Catalyst and Development in the Future," presented at a seminar held on Feb. 20, 1997 under a sponsorship of *Technical Information Institute Co., Ltd.*; Toso K.K. Yokkaich Research, p. 21 (1997).

Primary Examiner—Caixia Lu
(74) Attorney, Agent, or Firm—William R Reid

(57) ABSTRACT

A solid cocatalyst for olefin polymerization in which an ion-containing compound comprising a cation expressed by $[R_4M]+$, wherein the group R are each individually selected from the group consisting of hydrogen atom and a substituted or non-substituted hydrocarbon group having from 1 to 30 carbon atoms with the exception of an aryl group; two or more groups R may form a ring by bonding with one another; at least one of the groups R is a hydrocarbon group having from 1 to 30 carbon atoms with the exception of an aryl group; and M represents nitrogen or sulfur, and a non-coordinating anion expressed by [A] said ion-containing compound is chemically bonded to a fine particulate carrier is used.

12 Claims, No Drawings

SOLID COCATALYST COMPONENT FOR OLEFIN POLYMERIZATION AND CATALYST SYSTEM THEREOF

This application is the U.S. national phase of International Application PCT/EP02/11729, filed Oct. 17, 2002.

TECHNICAL FIELD OF THE INVENTION

The present invention relates to solid cocatalyst components and catalyst components thereof for the polymerization of olefins. Particularly, the present invention relates to a solid cocatalyst component for olefin polymerization which is capable of obtaining an olefin polymer with a high polymerization activity, even when an ion-containing compound comprising a cation derived from a low cost amine and a non-coordinating anion is used, and a catalyst for olefin polymerization to be obtained therefrom.

There has been known a method of using an ion-containing compound comprising a non-coordinating anion as a cocatalyst component of a metallocene catalyst; for example, International Patent Publication No. 502036/1989 discloses that an olefin is polymerized by an ion-containing compound comprising an ammonium ion and a non-coordinating anion and a metallocene compound.

The above-described publication describes that, when a low acidic ion such as a trialkyl ammonium ion is used as a cation of the ion-containing compound, there exists an induction period between the addition of a catalyst and the initiation of polymerization. The existence of such induction period is sometimes effective in suppressing problems such as a generation of a fine particle, a fouling of a polymerization vessel, a generation of a block polymer and the like, which are caused by an abrupt initiation of the polymerization.

However, it has been known that, when a low acidic ion such as a trialkyl ammonium ion is used as the above-described cation, polymerization activity is remarkably decreased. For example, Akira Akimoto's text presented at a seminar held on Feb. 20, 1997 under a sponsorship of Technical Information Institute Co., Ltd., p. 21 describes that, when an ion-containing compound having an ammonium ion to be derived from a high basic amine such as a trialkylamine and the like is used, the polymerization activity is extremely decreased.

Further, Japanese Patent Laid-Open No. 296306/1992 discloses that, when styrene is polymerized by using an ion-containing compound having a low acidic ammonium ion to be derived from the trialkylamine and the like, the activity is also remarkably decreased.

For these reasons, though an ammonium ion derived from a non-aromatic amine such as the trialkylamine and the like has such an advantage as described above, it has rarely been utilized and, instead, a high acidic ammonium ion derived from an amine in which an amino group is directly bonded to an aromatic ring (hereinafter also referred to as aromatic amine) such as dimethyl anilinium and the like has ordinarily been used as a cation of an ion-containing compound.

On the other hand, when a catalyst in which a high acidic ammonium ion derived from an aromatic amine is used, there is the problem that, though the polymerization activity is high, the decrease thereof along the passage of time after the preparation of the catalyst is high; therefore it is necessary to use the catalyst immediately after it is prepared.

An object of the present invention is to provide a solid cocatalyst component for olefin polymerization which uses an ion-containing compound having an ammonium ion derived from a low cost amine such as a trialkylamine and the like whereby being capable of giving an olefin polymer with a high polymerization activity and a catalyst for olefin polymerization which has a favorable storage stability to be obtained therefrom.

The present inventors have found that a solid cocatalyst component for olefin polymerization in which an ion-containing compound having a non-aromatic cation and a non-coordinating anion is chemically bonded on a fine particulate carrier gives an olefin polymer with a high polymerization activity to achieve the present invention.

Namely, the present invention provides:

(1) a solid cocatalyst component for olefin polymerization in which an ion-containing compound, comprising a cation expressed by $[R_4M]^+$ and a non-coordinating anion expressed by $[A]^-$, that is expressed by the following general formula (I) is chemically bonded to a fine particulate carrier, said ion-containing compound having formula (I):

$$[R_4M]^+ \cdot [A]^- \qquad (I)$$

wherein $[A]^-$ has formula $[M^1(R^1)_a(R^2)_b(R^3)_c(R^4\text{-L})_d]^-$ as described below;

The R groups may either be the same or different from one another and are each individually selected from a group consisting of a hydrogen atom and a substituted or non-substituted hydrocarbon group having from 1 to 30 carbon atoms excepting an aryl group; or two or more groups may form a ring by bonding with one another; at least one of the R's is a hydrocarbon group having from 1 to 30 carbon atoms with the exception of an aryl group; preferably the R groups, equal to or different from each other, are hydrogen atoms or linear or branched, saturated or unsaturated $C_1$-$C_{20}$-alkyl, $C_3$-$C_{20}$-cycloalkyl or $C_7$-$C_{20}$-alkylaryl radical;

M represents nitrogen or sulfur; preferably M is a nitrogen atom;

(2) the solid cocatalyst component for olefin polymerization in the above-described (1), wherein the ion-containing compound expressed by the general formula (1) is expressed by the following formula (2):

$$[M^1(R^1)_a(R^2)_b(R^3)_c(R^4\text{-L})_d]^- \cdot [R^4M]^+ \qquad (2)$$

wherein $M^1$ represents boron or aluminum; preferably $M^1$ is a boron atom;

$R^1$, $R^2$, and $R^3$ each individually represents a substituted or non-substituted hydrocarbon group having from 1 to 20 carbon atoms, an alkoxy group, a phenoxy group, or a halogen atom and may be the same or different from one another; preferably $R^1$, $R^2$, and $R^3$, equal to or different from each other, are halogen, halogenated $C_6$-$C_{20}$ aryl or halogenated $C_7$-$C_{20}$ alkylaryl groups;

$R^4$ represents a hydrocarbon group having from 1 to 20 carbon atoms which may contain a hetero atom; preferably $R^4$ is a $C_1$-$C_{20}$ arylene or a $C_1$-$C_{20}$ arylalkylene radical optionally containing heteroatoms belonging to groups 13-17 of the periodic table of the elements;

L represents a silyl group, a hydroxyl group, a carboxyl group, or an amino group; preferably L is a silyl group;

a, b, and c each individually represent an integer of from 0 to 3 and d represents an integer of from 1 to 4 wherein a relation of a+b+c+d=4 is satisfied;

R's and M are each individually the same as those defined in the above-described formula (1);

(3) a catalyst for olefin polymerization comprising a solid cocatalyst component (A) for olefin polymerization in the above-described (1) or (2), a metallocene compound (B), and an organoaluminum compound (C); and (4) an ion-containing compound expressed by the above-described general formula (2).

A solid cocatalyst component for olefin polymerization according to the present invention is prepared such that an ion-containing compound, comprising a cation expressed by $[R_4M]^+$ and a non-coordinating anion expressed by $[A]^-$, which are expressed by the above-described general formula (1), is chemically bonded to a fine particulate carrier. Examples of such chemical bonds as described above include a covalent bond, an ionic bond, a coordinate bond and the like. Further, it can be judged by measuring a change of contents of the above-described compound contained in the solid cocatalyst component before and after it is rinsed whether or not the ion-containing compound is chemically bonded thereto. Furthermore, the presence or absence of this chemical bond can be detected by measuring whether or not a non-coordinating ion-containing compound such as dichloromethane or the like, or this compound, a boron atom or the like contained in this compound which have been rinsed at a room temperature by a polar solvent which is inert to a carrier remains on the fine particulate carrier.

Preferably the present invention relates to a solid cocatalyst component comprising the product obtainable by contacting:

a) a ion containing compound of formula (2)

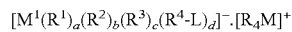

wherein $M^1R$, $R^1$, $R^2$, $R^3$, $R^4$, L, M, a,b,c and d have been described above; and b) a fine particulate carrier;

wherein the ion containing compound a) is chemically tethered on the surface of the said fine particulate carrier.

In $[R_4M]^+$ expressed by the general formula (1), the R groups may either be the same or different from one another and are each individually selected from the group consisting of a hydrogen atom and a substituted or non-substituted hydrocarbon group having from 1 to 30 carbon atoms with the exception of an aryl group; respective R's may form a ring by bonding with one another; at least one of the R's is a hydrocarbon group having from 1 to 30 carbon atoms with the exception of an aryl group; and M represents nitrogen or sulfur and preferably nitrogen.

Examples of hydrocarbon groups each having from 1 to 30 carbon atoms excepting an aryl group include chain alkyl groups or cyclic alkyl groups such as a methyl group, an ethyl group, an n-propyl group, an i-propyl group, an n-butyl group, an i-butyl group, a t-butyl group, a cyclohexyl group and the like, aryl alkyl groups such as a benzyl group, a 1-phenyl ethyl group, a 2-phenyl ethyl group, a cumyl group and the like. Among these, the aryl alkyl group and the cyclic alkyl group are preferable. Further, a part or all the hydrogen atoms of these hydrocarbon groups may each individually be substituted by at least one of a halogen atom, an alkoxy group, a silyl group and the like.

Furthermore, examples of silyl groups according to the present invention include a $SiH_3$ group and a substituted silyl group in which a part or all of hydrogen atoms of the $SiH_3$ group are substituted by another atom or an atomic group. Examples of such substituent groups include hydrocarbon groups such as an alkyl group having from 1 to 20 carbon atoms, an aryl group, an aryl alkyl group and the like, a halogen atom, an alkoxy group, a phenoxy group, an acyloxy group and the like.

Specific examples of cations expressed by the above-described formula $[R_4M]^+$ include a trimethyl ammonium ion, a triethyl ammonium ion, a tri-n-propyl ammonium ion, a tri-i-propyl ammonium ion, a tri-n-butyl ammonium ion, a di-i-propyl ammonium ion, di-i-butyl ammonium ion, a benzyl ammonium ion, an N-methyl benzyl ammonium ion, an N,N-dimethyl benzyl ammonium ion, an N-ethyl benzyl ammonium ion, an N,N-diethyl benzyl ammonium ion, a 1-phenyl ethyl dimethyl ammonium ion, a 2-phenyl ethyl dimethyl ammonium ion, a cumyl ammonium ion, an N,N-dimethyl cumyl ammonium ion, an N,N-diethyl cumyl ammonium ion and the like. Among these ions, the ions having a hydrogen atom as R are preferred and, further, an N,N-dimethyl benzyl ammonium ion or the like which has a hydrogen atom and an aryl group as group R is preferred.

$[A]^-$ in the general formula (1) represents a non-coordinating anion. By "non-coordinating anion" as herein used it is meant an anion which, when used with a metallocene compound as a polymerization catalyst, is not coordinated to a metallocene cation to be derived from the metallocene compound, or, even when it is coordinated, it is coordinated thereto in a weak manner and remains unstable to such an extent that it can be substituted by a neutral Lewis acid.

This $[A]^-$ is an anion to be derived from a compound containing an atom of Group 13 of the periodic table. Examples of atoms of Group 13 include boron and aluminum.

The solid cocatalyst component for olefin polymerization according to the present invention, is obtained by contacting an ion-containing compound (a-1) and a fine particulate carrier (a-2) which are shown in the above-described general formula (2).

In the general formula (2), the groups R and M have the meaning defined in the general formula (1), and $M^1$ is boron or aluminum and preferably boron. Further, $R^1$, $R^2$, and $R^3$ are each individually a substituted or non-substituted hydrocarbon group having from 1 to 20 carbon atoms, an alkoxy group, a phenoxy group or a halogen atom and they may be the same or different from one another. Examples of such hydrocarbon groups include alkyl groups such as a methyl group, an ethyl group, an n-propyl group, an i-propyl group, an n-butyl group, an i-butyl group, a t-butyl group and the like, aryl groups such as a phenyl group, a tolyl group, a dimethyl phenyl group and the like. The substituted hydrocarbon groups may be the above-described hydrocarbons in which a part or all the hydrogen atoms have been substituted by at least one of a halogen atom, an alkoxy group, a silyl group and the like and, as examples thereof, mentioned are a halogenated aryl group and the like. Examples of alkoxy groups include a methoxy group, an ethoxy group, a propoxy group and the like. Among these groups, the alkyl group, the aryl group and the halogenated aryl group are preferred and, among them the aryl group and the halogenated aryl group are particularly preferred.

Specific examples of such halogenated aryl groups as described above include fluorophenyl groups such as a 4-fluorophenyl group and the like, difluorophenyl groups such as a 2,4-difluorophenyl group, a 3,5-difluorophenyl group and the like, trifluorophenyl groups such as a 2,4,5-trifluorophenyl group, a 2,4,6-trifluorophenyl group and the like, tetrafluorophenyl groups such as a 2,3,5,6-tetrafluorophenyl group and the like, a pentafluorophenyl group, bis(trifluoromethyl)phenyl groups such as a 3,4-bis(trifluoromethyl)phenyl group, a 3,5-bis(trifluoromethyl)phenyl group and the like, tris(trifluoromethyl)phenyl groups such as a 2,3,5-tris(trifluoromethyl)phenyl group, a 2,4,6-tris(trifluoromethyl)phenyl group and the like, tetrakis(trifluoromethyl)phenyl groups such as a 2,3,5,6-tetrakis(trifluoromethyl)phenyl group and the like, a pentakis(trifluoromethyl) phenyl group and the like, and groups in which fluorine atoms of the above-described groups have each individually been substituted by other halogen atoms such as a chlorine atom, a bromine atom and the like Among these halogenated aryl groups, the fluorophenyl groups such as the trifluorophenyl group, the tetrafluorophenyl group, the pentafluorophenyl group and the like are preferred, the tetrafluorophenyl group and the pentafluorophenyl group are more preferred, and the pentafluorophenyl group is particularly preferred.

In the above-described ion-containing compound (a-1), $R^4$ is a hydrocarbon group having from 1 to 20 carbon atoms which may contain a hetero atom; specific examples thereof include a methylene group, an ethylene group, a propylene group, a butylene group, an ethylidene group, a propylidene group, fluorophenylene groups such as an o-phenylene group, a m-phenylene group, a p-phenylene group, a 4-fluoro-m-phenylene group, a 2-fluoro-p-phenylene group and the like, difluorophenylene groups such as a 4,5-difluoro-m-phenylene group, a 3,5-difluoro-p-phenylene group and the like, trifluorophenylene groups such as a 2,4,5-trifluoro-m-phenylene group, a 2,4,6-trifluoro-m-phenylene group, a 4,5,6-trifluoro-m-phenylene group, a 2,3,5-trifluoro-p-phenylene group, a 2,3,6-trifluoro-p-phenylene group and the like, tetrafluorophenylene groups such as a 3,4,5,6-tetrafluoro-o-phenylene group, a 2,4,5,6-tetrafluoro-m-phenylene group, a 2,3,5,6-tetrafluoro-p-phenylene group and the like. Alternatively, it may be a group expressed by a formula —($C_6H_4$)—X—, wherein —($C_6H_4$)— represents an o-, an m-, or a p-phenylene group; and —X— represents —($C_nH_{2n}$)— wherein n is an integer of from 1 to 10, —O—, —S—, —P—, or —N— and, a part or all of the hydrogen atoms in any one of the phenylene groups may be substituted by a halogen atom such as fluorine and the like.

Among these groups, the 2,4,5-trifluoro-m-phenylene group, the 2,4,6-trifluoro-m-phenylene group, the 4,5,6-trifluoro-m-phenylene group, the 2,3,5-trifluoro-p-phenylene group, the 2,3,6-trifluoro-p-phenylene group, the 3,4,5,6-tetrafluoro-o-phenylene group, the 2,4,5,6-tetrafluoro-m-phenylene group, and the 2,3,5,6-tetrafluoro-p-phenylene group are preferred, and, among them, further, the 2,4,5,6-tetrafluoro-m-phenylene group, and the 2,3,5,6-tetrafluoro-p-phenylene group are particularly preferred.

L in the ionic compound (a-1) is any one of a silyl group, a hydroxyl group, a carboxyl group, and an amino group and, among these groups, the silyl group and the hydroxyl group are preferred. The silyl group is, for example, expressed by the following general formula (3):

—[Si($Z^1Z^2$)-$Z^6$-]$_n$Si$Z^3Z^4Z^5$  (3)

wherein $Z^1$, $Z^2$, $Z^3$, $Z^4$, and $Z^5$ are each individually a member selected from the group consisting of: a halogen atom, an alkoxy group, a phenoxy group, an acyloxy group and a hydrocarbon group having from 1 to 20 carbon atoms, and, among them, at least one of $Z^3$, $Z^4$, and $Z^5$ is a halogen atom, a alkoxy group, a phenoxy group, or an acyloxy group;

$Z^6$ is a member selected from the group consisting of: an oxygen atom, an imino group, an alkylene group having from 1 to 20 carbon atoms, an arylene group having from 1 to 20 carbon atoms, and an oxaalkylene group having from 1 to 20 carbon atoms; and n is an integer of from 0 to 10.

Preferably $Z^1$, $Z^2$, $Z^3$, $Z^4$, and $Z^5$, equal to or different from each other, are halogen atoms, or a linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl or $C_7$-$C_{20}$-arylalkyl radical, optionally containing one or more oxygen atoms;

with the proviso that at least one of $Z^1$, $Z^2$, $Z^3$, $Z^4$, and $Z^5$ is an halogen atom;

It is preferred that n=0 and at least one of $Z^3$, $Z^4$, and $Z^5$ is a halogen atom.

Specific examples of the above-described silyl groups include trihalogenosilyl groups such as a trichlorosilyl group and the like, alkyl dihalogenosilyl groups such as a methyl dichlorosilyl group, an ethyl dichlorosilyl group and the like, dialkyl halogenosilyl groups such as a dimethyl chlorosilyl group, a diethyl chlorosilyl group and the like, aryl dihalogenosilyl groups such as a phenyldichlorosilyl group, a p-tolyl dichlorosilyl group and the like, diaryl halogenosilyl groups such as a diphenylchlorosilyl group and the like, trialkoxysilyl groups such as a trimethoxysilyl group, a triethoxysilyl group and the like, alkyl dialkoxysilyl groups such as a methyldimethoxysilyl group and the like, dialkyl alkoxysilyl groups such as a dimethylmethoxysilyl group, a dimethylethoxysilyl group and the like, aryl dialkoxysilyl groups such as a phenyldimethoxysilyl group, a tolyl dimethoxysilyl group and the like, diaryl alkoxysilyl groups such as a diphenylmethoxysilyl group, a ditolylmethoxysilyl group, a diphenylethoxysilyl group and the like, triacyloxysilyl groups such as a triacetoxysilyl group and the like, alkyl diacyloxysilyl groups such as a methyl diacetoxysilyl group and the like, dialkyl acyloxysilyl groups such as a dimethyl acetoxysilyl group and the like, aryl diacyloxysilyl groups such as a phenyldiacetoxysilyl group and the like, diaryl acyloxysilyl groups such as a diphenyl acetoxysilyl group and the like, alkyl hydroxysilyl groups such as a dimethylhydroxysilyl group and the like.

Among these groups, the trichlorosilyl group, the methyldichlorosilyl group, the dimethylchlorosilyl group, the trimethoxysilyl group, methyl dimethoxysilyl group, dimethyl methoxysilyl group, the triethoxysilyl group, the methyl diethoxysilyl group, the dimethyl ethoxysilyl group, the triacetoxysilyl group, the methyl diacetoxysilyl group, the dimethyl acetoxysilyl group, the trihydroxysilyl group, the methyl dihydroxysilyl group, and the dimethyl hydroxysilyl group are preferred, and, further, among them, the trichlorosilyl group, the methyl dichlorosilyl group, and the dimethyl chlorosilyl group are particularly preferred. Further, in the above-described ionic compound (a-1), a, b, and c are each individually an integer of from 0 to 3; d is an integer of from 1 to 4; on this occasion, a relation of a+b+c+d=4 is satisfied. A compound in which d=1 is preferred.

Specific examples of the above-described ionic compounds (a-1) which can favorably be used in the present invention include N,N-dimethyl benzyl ammonium [4-(chlorodimethyl silyl)-2,3,5,6-tetrafluorophenyl] tris(pentafluorophenyl) borate, N,N-dimethyl benzyl ammonium [4-(dichloromethyl silyl)-2,3,5,6-tetrafluorophenyl] tris(pentafluorophenyl) borate, N,N-dimethyl benzyl ammonium (4-trichlorosilyl-2,3,5,6-tetrafluorophenyl) tris(pentafluorophenyl) borate, N,N-dimethyl benzyl ammonium [4-(chlorodimethyl silyl)-phenyl] tris(pentafluorophenyl) borate, N,N-dimethyl benzyl ammonium [4-(dichloromethyl silyl)-phenyl] tris(pentafluorophenyl) borate, N,N-dimethyl benzyl ammonium (4-trichlorosilyl phenyl) tris(pentafluorophenyl) borate,
N,N-dimethyl benzyl ammonium (4-hydroxyphenyl) tris (pentafluorophenyl) borate,
N,N-dimethyl cyclohexyl ammonium [4-(chlorodimethyl silyl)-2,3,5,6-tetrafluorophenyl] tris(pentafluorophenyl) borate,
N,N-dimethyl cyclohexyl ammonium [4-(dichloromethyl silyl)-2,3,5,6-tetrafluorophenyl] tris(pentafluorophenyl) borate,
N,N-dimethyl cyclohexyl ammonium (4-trichlorosilyl-2,3,5,6-tetrafluorophenyl) tris(pentafluorophenyl) borate,
N,N-dimethyl cyclohexyl ammonium [4-(chlorodimethyl silyl)-phenyl] tris(pentafluorophenyl) borate,
N,N-dimethyl cyclohexyl ammonium [4-(dichloromethyl silyl)-phenyl] tris(pentafluorophenyl) borate,
N,N-dimethyl cyclohexyl ammonium (4-trichlorosilyl phenyl) tris(pentafluorophenyl) borate,
N,N-dimethyl cyclohexyl ammonium (4-hydroxyphenyl) tris(pentafluorophenyl) borate.
triethyl ammonium [4-(chlorodimethyl silyl)-2,3,5,6-tetrafluorophenyl] tris(pentafluorophenyl) borate,
triethyl ammonium [4-(dichloromethyl silyl)-2,3,5,6-tetrafluorophenyl] tris(pentafluorophenyl) borate,
triethyl ammonium (4-trichlorosilyl-2,3,5,6-tetrafluorophenyl) tris(pentafluorophenyl) borate,
tri-n-butyl ammonium [4-(chlorodimethyl silyl)-2,3,5,6-tetrafluorophenyl] tris(pentafluorophenyl) borate,
tri-n-butyl ammonium [4-(dichloromethyl silyl)-2,3,5,6-tetrafluorophenyl] tris(pentafluorophenyl) borate,
tri-n-butyl ammonium (4-trichlorosilyl-2,3,5,6-tetrafluorophenyl) tris(pentafluorophenyl) borate,
tri-n-butyl ammonium [4-(chlorodimethyl silyl)-phenyl] tris(pentafluorophenyl) borate,
tri-n-butyl ammonium [4-(dichloromethyl silyl)-phenyl] tris(pentafluorophenyl) borate,
tri-n-butyl ammonium (4-trichlorosilyl phenyl) tris(pentafluorophenyl) borate,
tri-n-butyl ammonium (4-hydroxyphenyl) tris(pentafluorophenyl) borate and the like.

These ion-containing compounds can be synthesized by known methods. Specifically, illustrated is a method in which a triaryl borane is reacted with an aryl lithium, an aryl magnesium halide or the like to synthesize an ion-containing compound and, then, a reactive group such as a silyl group and the like which has reactivity with a carrier is introduced into the thus-synthesized ion-containing compound.

Examples of fine particulate carriers (a-2) to be used in the present invention include a metal oxide, a metal halide, a metal hydroxide, a metal alkoxide, a carbonate, a sulfate, an acetate, a silicate, an organic high molecular compound and the like. These compounds can optionally be used either individually or in any combinations thereof. They may also be treated with organoaluminum, organosilicon compounds and the like.

Examples of the above-described metal oxides include silica, alumina, titania, magnesia, zirconia, calcia, zinc oxide and the like. Examples of the above-described metal halides include magnesium chloride, calcium chloride, barium chloride, sodium chloride and the like.

Examples of the above-described metal hydroxides include aluminum hydroxide, magnesium hydroxide and the like. Examples of the above-described metal alkoxides include magnesium ethoxide, magnesium methoxide and the like. Examples of the above-described carbonates include calcium carbonate, basic calcium carbonate, magnesium carbonate, basic magnesium carbonate, barium carbonate and the like. Examples of the above-described sulfates include calcium sulfate, magnesium sulfate, barium sulfate and the like. Examples of the above-described acetates include calcium acetate, magnesium acetate and the like. Examples of the above-described silicates include mica, magnesium silicate such as talc and the like, calcium silicate, sodium silicate and the like. Of these, silicates such as silica, alumina, mica, magnesium silicate such as talc and the like, calcium silicate, sodium silicate and the like are preferred.

Examples of above-described organic high molecular compounds include polyolefins and derivatives thereof such as polyethylene, polypropylene, an ethylene-propylene copolymer, an ethylene-vinyl ester copolymer, a partially or fully saponified ethylene-vinyl ester copolymer, thermoplastic resins such as a polyamide, a polycarbonate, a polyester and the like, thermosetting resins such as a phenolic resin, an epoxy resin, a urea resin, a melamine resin and the like.

Among these organic high molecular compounds, preferred are compounds having a polar group such as a hydroxyl group, a carboxyl group, an amino group, an amide group and the like; specifically, mentioned are a modified polyolefin which has been graft-modified with an unsaturated compound having a hydroxyl group, an unsaturated carboxylic acid or the like, a partially or fully saponified ethylene-vinyl ester copolymer and the like.

An average particle size of these fine particulate carriers is not limited to any particular type, but is ordinarily in a range of from 0.1 μm to 2000 μm, preferably in a range of from 1 μm to 1000 μm, and more preferably in a range of from 5 μm to 100 μm. Further, a specific surface area is not limited to any particular type, but is ordinarily in a range of from 0.1 m$^2$/g to 2000 m$^2$/g, preferably in a range of from 10 m$^2$/g to 1500 m$^2$/g, and more preferably in a range of from 100 m$^2$/g to 1000 m$^2$/g.

A contact for effecting a chemical bond between the above-described ion-containing compound (a-1) and the fine particulate carrier (a-2) can be performed according to methods known in the art; they may directly be contacted with each other in the absence of an organic solvent, but it is ordinarily done in the presence of the organic solvent. Examples of such organic solvents that may be used include aliphatic hydrocarbons such as pentane, hexane and the like, aromatic hydrocarbons such as benzene, toluene and the like, halogenated hydrocarbons such as methylene chloride, chlorobenzene and the like, ethers such as diethyl ether, tetrahydrofuran and the like, amides such as N,N-dimethyl formamide, N-methyl pyrrolidone and the like, alcohols such as methanol, ethanol, propanol, n-butanol and the like, and any combinations thereof and the like.

The contact between the above-described ion-containing compound (a-1) and the fine particulate carrier (a-2) can be executed at different temperatures, taking into consideration an organic solvent to be used and other conditions, but is executed at a temperature ordinarily in a range of from −80° C. to 300° C., preferably in a range of from −50° C. to 200° C., and more preferably in a range of from 0° C. to 150° C. The solid catalyst component obtained by such contact may be used after an unreacted substance is removed therefrom by rinsing or other operations or may be used after it is dried.

A quantity of the above-described ion-containing compound (a-1) to be used with the fine particulate carrier (a-2) is not limited to any particular type, but is ordinarily in a range of from 0.0001 part by weight to 1000000 parts by weight based on 100 parts by weight of the fine particulate carrier (a-2). When the quantity of the ion-containing compound (a-1) to be used becomes larger, the polymerization activity of the catalyst tends increase; however, when the balance between the polymerization activity and a production cost is taken into consideration, the quantity of the ion-containing compound (a-1) to be used, based on 100 parts by weight of the fine particulate carrier (a-2), is preferably in a range of from 0.1 part by weight to 10000 parts by weight, and more preferably in a range of from 1 part by weight to 1000 parts by weight.

Next, a catalyst for olefin polymerization according to the present invention will be explained. The catalyst for olefin polymerization according to the present invention may comprise the above-described solid cocatalyst component (A) and a metallocene compound (B), or may, together with these (A) and (B), further comprise an organoaluminum compound (C).

Thus a further object of the present invention is a solid catalyst system comprising the product obtainable by contacting:

(A) a solid catalyst component obtained by contacting:
(a-1) a ion containing compound of formula (2)

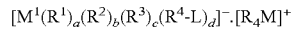

wherein $M^1$ R, $R^1$, $R^2$, $R^3$, $R^4$, L, M, a, b, c and d have been described above; and
(a-2) a fine particulate carrier;
(B) a metallocene compound; and optionally
(C) an organoaluminum compound.

Metallocene compounds are preferably compounds belonging to the following formula (3)

$$(Cp)(ZR^8_m)_n(A)_rM^2L'_p \qquad (3)$$

wherein $(ZR^8_m)_n$ is a divalent group bridging Cp and A; Z being C, Si, Ge, N or P, and the $R^8$ groups, equal to or different from each other, being hydrogen or linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ alkylaryl or $C_7$-$C_{20}$ arylalkyl groups or two $R^8$ can form a aliphatic or aromatic $C_4$-$C_7$ ring;

Cp is a substituted or unsubstituted cyclopentadienyl group, optionally condensed to one or more substituted or unsubstituted, saturated, unsaturated or aromatic rings, containing from 4 to 6 carbon atoms, optionally containing one or more heteroatoms;

A is O, S, $NR^9$, $PR^9$ wherein $R^9$ is hydrogen, a linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl, or A has the same meaning of Cp;

$M^2$ is a transition metal belonging to group 4, 5 or to the lanthanide or actinide groups of the Periodic Table of the Elements (IUPAC version);

the substituents L', equal to or different from each other, are monoanionic sigma ligands selected from the group consisting of hydrogen, halogen, $R^{10}$, $OR^{10}$, $OCOR^{10}$, $SR^{10}$, $NR^{10}_2$ and $PR^{10}_2$, wherein $R^{10}$ is a linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl group, optionally containing one or more Si or Ge atoms; preferably, the substituents L' are the same;

m is 1 or 2, and more specifically it is 1 when Z is N or P, and it is 2 when Z is C, Si or Ge;

n is an integer ranging from 0 to 4;

r is 0, 1 or 2; preferably 0 or 1; n is 0 when r is 0;

p is an integer equal to the oxidation state of the metal $M^2$ minus r+1; i.e. minus 3 when r=2, minus 2 when r=1, and minus 1 when r=0, and ranges from 1 to 4.

In the metallocene compound of formula (3), the divalent bridge $(ZR^8_m)_n$ is preferably selected from the group consisting of $CR^8_2$, $(CR^8_2)_2$, $(CR^8_2)_3$, $SiR^8_2$, $GeR^8_2$, $NR^8$ and $PR^8$, $R^8$ having the meaning reported above; more preferably, said divalent bridge is $Si(CH_3)_2$, $SiPh_2$, $CH_2$, $(CH_2)_2$, $(CH_2)_3$ or $C(CH_3)_2$.

The variable m is preferably 1 or 2; the variable n ranges preferably from 0 to 4 and, when n>1, the atoms Z can be the same or different from each other, such as in divalent bridges $CH_2$—O, $CH_2$—S and $CH_2$—$Si(CH_3)_2$.

The ligand Cp, which is π-bonded to said metal $M^2$, is preferably selected from the group consisting of cyclopentadienyl, mono-, di-, tri- and tetra-methyl cyclopentadienyl; -4-$^t$butyl-cyclopentadienyl; 4-adamantyl-cyclopentadienyl; indenyl; mono-, di-, tri- and tetra-methyl indenyl; 2-methyl indenyl, 3-$^t$butyl-indenyl, 4-phenyl indenyl, 4,5 benzo indenyl; 3-trimethylsilyl-indenyl; 4,5,6,7-tetrahydroindenyl; fluorenyl; 5,10-dihydroindeno[1,2-b]indol-10-yl; N-methyl- or N-phenyl-5,10-dihydroindeno [1,2-b]indol-10-yl; 5,6-dihydroindeno[2,1-b]indol-6-yl; N-methyl- or N-phenyl-5,6-dihydroindeno[2,1-b]indol-6-yl; azapentalene-4-yl; thiapentalene-4-yl; azapentalene-6-yl; thiapentalene-6-yl; mono-, di- and tri-methyl-azapentalene-4- yl, and 2,5-dimethyl-cyclopenta[1,2-b:4,3-b']-dithiophene.

The group A is O, S, $N(R^9)$, wherein $R^9$ is hydrogen, a linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl, preferably $R^9$ is methyl, ethyl, n-propyl, isopropyl, n-butyl, t-butyl, phenyl, p-n-butyl-phenyl, benzyl, cyclohexyl and cyclododecyl; more preferably $R^9$ is t-butyl; or A has the same meaning of Cp.

As for the metallocene compound (B) used in the present invention, a known compound can be used; when it is used for producing a propylene polymer, a type which can polymerize propylene in a stereoregular manner is preferred. Specific examples of such types of metallocene compounds include bis(2,3-dimethyl cyclopentadienyl) dimethyl silane zirconium dichloride, bis(2,4-dimethyl cyclopentadienyl) dimethyl silane zirconium dichloride, bis(2,3,5-trimethyl cyclopentadienyl) dimethyl silane zirconium dichloride, (methyl cyclopentadienyl) (1-indenyl) dimethyl silane zirconium dichloride, (3-t-butyl cyclopentadienyl) (1-indenyl) dimethyl silane zirconium dichloride and the like.

Also employable are (3-t-butyl cyclopentadienyl) [4-t-butyl-(1-indenyl)] dimethyl silane zirconium dichloride, (methyl cyclopentadienyl) (9-fluorenyl) dimethyl silane zirconium dichloride, (3-t-butyl cyclopentadienyl) (9-fluorenyl) dimethyl silane zirconium dichloride, bis(1-indenyl)] dimethyl silane zirconium dichloride, bis(2-methyl-1-indenyl) dimethyl silane zirconium dichloride, bis(2,4,7-trimethyl-1-indenyl) dimethyl silane zirconium dichloride, bis (2,4-dimethyl- 1-indenyl) dimethyl silane zirconium dichloride, bis(2-ethyl-1-indenyl) dimethyl silane zirconium dichloride, bis(2-i-propyl-1-indenyl) dimethyl silane zirconium dichloride and the like.

Further, applicable are metallocene compounds each having a structure, in which an indenyl core is further condensed with a ring, that are disclosed by Japanese Patent Laid-Opens No. 184179/1994, No. 345809/1994 and the like, that is, bis(2-methyl-4,5 benzo-1-indenyl) dimethyl silane zirconium dichloride, bis(2-methyl-α-acenaphtho-1-indenyl) dimethyl silane zirconium dichloride, bis(2-methyl-4,5-benzo-1-indenyl) methyl phenyl silane zirconium dichloride, bis(2-methyl-α-acenaphtho-1-indenyl) methyl phenyl silane zirconium dichloride, 1,2-bis(2-methyl-4,5-benzo-1-indenyl) ethane zirconium dichloride, bis(4,5-benzo-1-indenyl) dimethyl silane zirconium dichloride, and the like.

Furthermore, applicable are metallocene compounds each having an aryl group in the 4th position of an indenyl core thereof which are disclosed by Japanese Patent Laid-Opens No. 100579/1994 and No. 176222/1997 and the like, that is, bis(2-methyl-4-phenyl-1-indenyl) dimethyl silane zirconium dichloride, (2-methyl-4-phenyl-1-indenyl) dimethyl silane zirconium dichloride, bis[2-methyl-4-(1-naphthyl)-1-indenyl] dimethyl silane zirconium dichloride, bis[2-methyl-4-(2-naphthyl)-1-indenyl] dimethyl silane zirconium dichloride, bis[2-methyl-4-(9-anthrathenyl)-1-indenyl] dimethyl silane zirconium dichloride, bis[2-methyl-4-(9-phenanthryl)-1-indenyl] dimethyl silane zirconium dichloride, bis[2-methyl-4-(3,5-di-i-propyl-phenyl)-6-i-propyl-1-indenyl] dimethyl silane zirconium dichloride, bis(2-methyl-4-phenyl-6-i-propyl-1-indenyl) dimethyl silane zirconium dichloride, and the like.

Still further, applicable are metallocene compounds each having an azulene core which are disclosed by Japanese Patent Laid-Opens No. 226712/1998, No. 279588/1998 and the like, that is, bis(2-methyl-4-phenyl-4-hydro-1-azlenyl) dimethyl silane zirconium dichloride, bis(2-ethyl-4-phenyl-4-hydro-1-azlenyl) dimethyl silane zirconium dichloride, bis[2-methyl-4-(chlorophenyl)-4-hydro-1-azlenyl] dimethyl silane zirconium dichloride, bis[2-methyl-4-(fluorophenyl)-4-hydro-1-azlenyl] dimethyl silane zirconium dichloride, bis(2-methyl-4-phenyl-4-hydro-1-azlenyl) (chloromethyl) methyl silane zirconium dichloride, and the like.

Still furthermore, applicable are bis[2-methyl-($\eta^5$-1-indenyl)] methyl phenyl silane zirconium dichloride, 1,2-bis($\eta^5$-1-indenyl) ethane zirconium dichloride, 1,2-bis[2-methyl-($\eta^5$-1-indenyl)] ethane zirconium dichloride, 1,2-bis[2,4-dimethyl-($\eta^5$-1-indenyl)] ethane zirconium dichloride, 1,2-bis[2,4,7-trimethyl-($\eta^5$-1-indenyl)] ethane zirconium dichloride, 1,2-bis[2-ethyl-($\eta^5$-1-indenyl)] ethane zirconium dichloride, 1,2-bis[2-n-propyl-($\eta^5$-1-indenyl)] ethane zirconium dichloride, 1,2-ethyl-($\eta^5$-1-indenyl) [2-methyl-($\eta^5$-1-indenyl)] ethane zirconium dichloride, 1,2-bis($\eta^5$-9-fluorenyl) ethane zirconium dichloride, 2-(3-t-butyl cyclopentadienyl)-2-($\eta^5$-1-indenyl) propane zirconium dichloride, 2-(3-t-butyl cyclopentadienyl)-2-[4-t-butyl-($\eta^5$-1-indenyl)] propane zirconium dichloride, 2-(3-methyl cyclopentadienyl)-2-($\eta^5$-9-fluorenyl) propane zirconium dichloride, 2-(3-t-butyl cyclopentadienyl)-2-($\eta^5$-9-fluorenyl) propane zirconium dichloride, and the like.

Preferred metallocenes are compounds each having an aryl group in the 4th position of an indenyl core thereof which are disclosed by Japanese Patent Laid-Opens No. 100579/1994, No. 176222/1997 and the like, metallocene compounds each having a structure, in which an indenyl core is further condensed with a ring, that are disclosed by Japanese Patent Laid-Opens No. 184179/1994, No. 345809/1994 and the like, and metallocene compounds having an azulene core which are disclosed by Japanese Patent Laid-Opens No. 226712/1998, No. 279588/1998 and the like, and, particularly, bis[2-methyl-4,5-benzo($\eta^5$-1-indenyl)] dimethyl silane zirconium dichloride, bis[2-methyl-4-phenyl-($\eta^5$-1-indenyl)] dimethyl silane zirconium dichloride, bis[2-methyl-4-(1-naphthyl)-($\eta^5$-1-indenyl)] dimethyl silane zirconium dichloride, and bis(2-methyl-4-phenyl-4-hydro-1-azulenyl) dimethyl silane zirconium dichloride are preferred.

Moreover, compounds to be derived from these metallocene compounds by replacing zirconium contained therein by other metals such as titanium, hafnium and the like or by replacing a chlorine atom contained therein by other halogens, a hydrogen atom, an amide group, an alkoxy group, hydrocarbon groups such as a methyl group, a benzyl group and the like can be used without limitations.

It is preferable that the catalyst for olefin polymerization according to the present invention comprises not only the above-described components (A) and (B), but also an organic alkyl aluminum compound as a component(C).

The component (C) to be used in the present invention is an organoaluminum compound and known types thereof can be used without limitations. Examples of such organoaluminum compounds include trialkyl aluminums such as trimethyl aluminum, triethyl aluminum, tri-n-propyl aluminum, tri-n-butyl aluminum, tri-i-butyl aluminum, tri-n-hexyl aluminum, tri-i-hexyl aluminum, tri-n-octyl aluminum, tri-i-octyl aluminum, tri-n-decyl aluminum, tri-i-decyl aluminum, trihexadecyl aluminum and the like, dialkyl aluminum halides such as diethyl aluminum dichloride, ethyl aluminum dichloride and the like, alkyl aluminum dihalides, dialkyl aluminum hydrides such as diisobutyl aluminum hydride and the like, diethyl aluminum ethoxide, diethyl aluminum phenoxide and the like. Among these compounds, trialkyl aluminums are preferable; specific examples thereof are trimethyl aluminum, triethyl aluminum, tri-n-propyl aluminum, tri-n-butyl aluminum, tri-i-butyl aluminum, tri-n-hexyl aluminum, tri-i-hexyl aluminum, tri-n-octyl aluminum, tri-i-octyl aluminum, tri-n-decyl aluminum, tri-i-decyl aluminum, trihexadecyl aluminum and the like, and most preferred are tri-n-butyl aluminum, tri-n-hexyl aluminum and tri-n-octyl aluminum.

The catalyst for olefin polymerization according to the present invention can also comprise at least another organometallic compound different from the organoaluminum compounds of component (C), that is, an organolithium compound, an organomagnesium compound, an organozinc compound and the like.

Examples of such organolithium compounds include aryl lithiums such as phenyl lithium and the like, alkyl lithiums such as methyl lithium, n-butyl lithium, i-butyl lithium, s-butyl lithium, t-butyl lithium and the like. Examples of organozinc compounds include dimethyl zinc, diethyl zinc and the like. Examples of organomagnesiums include dialkyl magnesiums such as di-n-butyl magnesium, n-butyl ethyl magnesium, methyl magnesium bromide, ethyl magnesium bromide, n-propyl magnesium bromide and the like, alkyl magnesium halides such as i-propyl magnesium bromide, n-butyl magnesium chloride, i-butyl magnesium chloride, s-butyl magnesium chloride, t-butyl magnesium chloride, phenyl magnesium bromide and other alkyl magnesium halides derived from above-described alkyl magnesium halides by replacing a bromine atom or a chlorine atom contained therein by other halogen atoms, and the like.

The catalyst for olefin polymerization to be used in the present invention, comprising the above-described components (A), and (B), or components (A), (B), and (C) can be prepared by contacting these components with one another by means of various methods. When the components (A), (B), and (C) are contacted with one another, the order of contacting them is optional. Various types of methods: are suitable, for example, a method (1) in which (B) and (C) are first contacted with each other and, then, (A) is contacted to them; a method (2) in which (A) and (C) are first contacted with each other and, then, (B) is contacted to them; a method (3) in which (A) and (B) are first contacted with each other and, then, (C) is contacted to them; a method (4) in which (A), (B), and (C) are contacted with one another at the same time; a method (5) in which (B) and (C), and (A) and (C) are first contacted with each other, respectively and, then, the thus contacted two combinations are further contacted with each other, and the like.

Such contacts as described above are ordinarily executed in a hydrocarbon solvent; the above-described hydrocarbons can be suitable used. Among them, aliphatic hydrocarbons and alicyclic hydrocarbons are preferred, and, particularly, pentane, hexane, heptane, cyclohexane, and methyl cyclohexane are preferred.

The contacts among (A), (B), and (C) are executed ordinarily at a temperature in a range of from −50° C. to 150° C., preferably in a range of from −20° C. to 80° C., more preferably in range of from −20° C. to 70° C., and even more preferably in a range of from 0° C. to 50° C. The period of time for the contact is ordinarily in a range of from 10 seconds to 10 hours, preferably in a range of from 1 minute to 5 hours and more preferably in a range of from 2 minutes to 2 hours.

The concentration of (B) at the time of contact between (A) and (B) is ordinarily in a range of from 0.0001 mmol/l to 100 mmol/l, preferably in a range of from 0.001 mmol/l to 10 mmol/l, and more preferably in a range of from 0.001 mmol/l to 1 mmol/l.

As for a quantity of the above-described (B) to be used against the above-described (A), a quantity of an ion-containing compound contained in (A), based on 1 mol of a transition metal such as zirconium and the like contained in (B), is ordinarily preferably in a range of from 0.05 mol to 100 mol, more preferably in a range of from 0.1 mol to 50 mol, even more preferably in a range of from 1.0 mol to 10 mol and particularly preferably in a range of from 1.5 mol to 5.0 mol.

The catalyst for olefin polymerization according to the present invention can be used in various polymerization methods. Specifically, it can be used in a block polymerization method performed in a liquid olefin, a solution or slurry polymerization method performed in a liquid phase in the presence of an inert solvent, and a gas phase polymerization method performed in a vapor phase monomer. Among these methods, the block polymerization and gas phase polymerization methods are preferred and, among them, the block polymerization method is particularly preferred.

Polymerization temperature can be various, depending on the productivity or the molecular weight of an olefin polymer to be produced but ordinarily it is in a range of from 0° C. to 130° C., preferably in a range of from 20° C. to 120° C., more preferably in a range of from 40° C. to 100° C., and even more preferably in a range of from 56° C. to 95° C., and most preferably in a range of from 60° C. to 90° C. The pressure to be applied is ordinarily in a range of from a normal pressure to 7.0 MPa for polymerization in liquid phase, and in a range of from a normal pressure to 5.0 MPa for polymerization in gas phase; an appropriate range can optionally be selected according to the characteristics, the productivity and the like of the olefin polymer to be targeted. Further, at the time of polymerization, molecular weight can be adjusted by optional means such as introducing quantity of hydrogen, or by selecting temperature, pressure, or the like.

The catalyst for olefin polymerization according to the present invention can be applied to the polymerization or copolymerization of ethylene, propylene, and an α-olefin. Examples of suitable α-olefins include 1-butene, 1-pentene, 1-hexene, 1-octene, 3-methyl-1-butene, 4-methyl-1-pentene, 1-decene, vinylcyclohexane and the like, and any combinations thereof; a small quantity of a vinyl aromatic compound such as styrene, vinyl toluene or the like, a conjugate or non-conjugate diene and the like such as butadiene, isoprene, chloroprene, 1,4-hexadiene and the like can be copolymerized, so far as it is within the scope and spirit of the present invention.

Thus a further object of the present invention is a process for polymerizing one or more olefins of formula $CH_2=CHR^{11}$ wherein $R^{11}$ is a hydrogen atom or a $C_1$-$C_{20}$ alkyl radical optionally with a conjugate or non-conjugate diene comprising the step of contacting said olefins and optionally said diene under polymerization conditions in the presence of the catalyst system described above.

Further, in the present invention, the above-described catalyst for olefin polymerization can be used as a catalyst for preliminary polymerization which is employed when a small quantity of olefin is preliminarily polymerized. By performing the preliminary polymerization, it becomes easy to suppress occurrence of fouling or generation of a block polymer. In the preliminary polymerization, the olefin is polymerized such that, based on 1 g of the above-described catalyst for polymerization, the quantity of the olefin is ordinarily in a range of 0.01 g to 2000 g, preferably in a range of from 0.1 g to 1000 g, more preferably in a range of from 1.0 g to 500 g and particularly preferably in a range of from 1.5 g to 250 g.

The olefins that can be suitably used are not limited to any particular type; straight chain olefins such as ethylene, propylene, 1-butene, 1-hexene, 1-octene and the like, side chain olefins such as 4-methyl-1-butene, 4-methyl-1-pentene and the like, cyclic olefins such as vinyl cyclohexane, vinyl cyclohexene, vinyl norbornane, vinyl norbornene, ethylidene norbornene, norbornene, dicyclopentadiene and the like can be used. Among these olefins, preferred are straight chain olefins such as ethylene, propylene, 1-butene and the like, cyclic olefins such as vinyl cyclohexane and the like, and particularly preferred are olefins which each contain propylene as a primary component; even more preferably propylene is homopolymerized.

The preliminary polymerization can be carried out according to various methods, and it can be performed by contacting the catalyst with a liquid or gaseous olefin either in an optional diluent or in the absence of the diluent. The temperature of the preliminary polymerization is not limited to any particular range, but is ordinarily in a range of from −80° C. to 150° C., preferably in a range of from 0° C. to 100° C., more preferably in a range of from 10° C. to 90° C. and even more preferably in a range of from 20° C. to 80° C. The thus preliminarily polymerized olefins may be used for further polymerization as they are or they can be used after they are subjected to a rinsing or drying operation.

EXAMPLES

The following examples further specifically illustrate the present invention but do not limit the scope of the present invention.

(A) Solid Cocatalyst Component for Olefin Polymerization (A-1)

0.5 g of silica as a fine particulate carrier (a-2) and 20 ml of dichloromethane were loaded in a 100 ml capacity flask inerted with nitrogen. Next, a solution in which 0.45 g of N,N-dimethyl benzyl ammonium [4-(chlorodimethyl silyl)-2,3,5,6-tetrafluorophenyl] tris(pentafluorophenyl) borate as being an ionic compound (a-1) had been dissolved in 10 ml of dichloromethane was added to the above-described flask and, then, refluxed for 2 hours under stirring. After the supernatant liquid was removed from the resultant reaction mixture, it was rinsed with dichloromethane to obtain a component (A-1).

(A-2)

The same procedures as in preparation of the above-described component (A-1) were repeated except that N,N-dimethyl benzyl ammonium [4-(methyl dichlorosilyl)-2,3,5, 6-tetrafluorophenyl] tris(pentafluorophenyl) borate was used as an ionic compound (a-1) to obtain a component (A-2).

(A-3)

The same procedures as in preparation of the above-described component (A-1) were repeated except that N,N-dimethyl cyclohexyl ammonium [4-(chlorodimethyl silyl)-2,3,5,6-tetrafluorophenyl] tris(pentafluorophenyl) borate was used as an ionic compound (a-1) to obtain a component (A-3).

(A-4)

The same procedures as in preparation of the above-described component (A-1) were repeated except that tri-n-butyl ammonium [4-(chlorodimethyl silyl)-2,3,5,6-tetrafluorophenyl] tris(pentafluorophenyl) borate was used as an ionic compound (a-1) to obtain a component (A-4).

Example 1

(1) Preparation of Catalyst for Olefin Polymerization 30 mg of the above-prepared component (A-1) was placed in a 30 ml capacity flask under a nitrogen stream and, then, added with 1.0 μmol of bis(2-methyl-4-phenyl-$\eta^5$-1-indenyl) dimethyl silane zirconium dichloride (hereinafter also referred to as MPIZ) as (B) and 2.0 ml of a 0.5 mol/l hexane solution of tri-n-octyl aluminum (hereinafter also referred to as TNOA) as (C) and, thereafter, stirred at room temperature for 5 minutes to obtain a slurry of a catalyst for polymerization. The thus obtained slurry was stored at room temperature for 5 days and used for polymerization described below.

(2) Polymerization of Propylene 1 ml of a 0.5 mol/l hexane solution of TNOA as the component (C), and 8 mol of propylene were loaded in a 1.5 l capacity autoclave and, then, heated to 70° C. and, thereafter, the above-prepared catalyst for polymerization was forced into the autoclave to initiate a reaction. After 20 minutes have passed after the catalyst was loaded into the autoclave, the reaction was terminated by removing unreacted propylene to obtain a propylene polymer. Polymerization activity was 8700 g/g-component (A)/hour.

Reference Example 1

The same procedures as in Example 1 were repeated except that N,N-dimethyl anilinium [4-(chlorodimethyl silyl)-2,3,5,6-tetrafluorophenyl] tris(pentafluorophenyl) borate was used as (a-1) in place of N,N-dimethyl benzyl ammonium [4-(chlorodimethyl silyl)-2,3,5,6-tetrafluorophenyl] tris(pentafluorophenyl) borate to obtain a propylene polymer. Polymerization activity was 2000 g/g-component (A)/hour.

Example 2

(1) Preparation of Catalyst for Olefin Polymerization 10 mg of the above-prepared component (A-1) was placed in a 30 ml capacity flask under a nitrogen stream and, then, added with 0.5 μmol of bis[2-methyl-4-(1-naphthyl)-($\eta^5$-1-indenyl)] dimethyl silane zirconium dichloride (hereinafter also referred to as MNIZ) as (B) and 1.0 ml of a 0.5 mol/l hexane solution of TNOA as (C) and, thereafter, stirred at 50° C. for 30 minutes to obtain a slurry of a catalyst for polymerization.

(2) Copolymerization of Propylene and Ethylene 1 ml of a 0.5 mol/l hexane solution of TNOA as the component (C), and 8 mol of propylene were loaded in a 1.5 l capacity autoclave and, then, heated to 65° C. and, thereafter, the above-prepared catalyst for polymerization was forced into the autoclave to initiate a reaction. After 1 minute has passed after the reaction started, ethylene was introduced thereinto such that a partial pressure thereof comes to be 0.25 MPa to allow ethylene and propylene to be copolymerized at 70° C. After 15 minutes have passed after ethylene was introduced, the reaction was terminated by forcing ethanol into the autoclave and also removing unreacted propylene to obtain a propylene copolymer. Polymerization activity was 79000 g/g-component (A)/hour.

Example 3

The same procedures as in Example 2 were repeated except that (A-2) was used in place of (A-1) to obtain a propylene copolymer. Polymerization activity was 81000 g/g-component (A)/hour.

Example 4

The same procedures as in Example 2 were repeated except that (A-3) was used in place of (A-1) and that a catalyst for olefin polymerization was prepared at 60° C. for 30 minutes to produce a propylene copolymer. Polymerization activity was 69000 g/g-component (A)/hour.

Example 5

The same procedures as in Example 2 were repeated except that (A-4) was used in place of (A-1) and that a catalyst for olefin polymerization was prepared at 60° C. for 60 minutes to produce a propylene copolymer. Polymerization activity was 62000 g/g-component (A)/hour.

Example 6

The same procedures as in Example 1 were repeated except that tri-n-hexyl aluminum (hereinafter also referred to as TNHA) was used in place of TNOA to produce a propylene polymer. Polymerization activity was 7500 g/g-component (A)/hour.

Reference Example 2

The same procedures as in Example 2 were repeated except that N,N-dimethyl anilinium [4-(chlorodimethyl silyl)-2,3,5,6-tetrafluorophenyl] tris(pentafluorophenyl) borate was used as (a-1) in place of N,N-dimethyl benzyl ammonium [4-(chlorodimethyl silyl)-2,3,5,6-tetrafluorophenyl] tris(pentafluorophenyl) borate to produce a propylene copolymer. Polymerization activity was 82000 g/g-component (A)/hour.

Examples 7-9

(1) Preparation of Catalyst for Olefin Polymerization

The cocatalyst (A-2) was suspended in TNOA (0.5 molar solution in n-heptane, amount indicated in table 1 as TNOA-A). After stirring at 50° C. for 30 min, a solution bis (1-methyl-3-n-butyl-cyclopentadienyl) zirconium dichloride as the component (B) in TNOA as the component (C) (0.5 molar solution in n-heptane indicated in table 1 as TNAO-B) (amounts indicated in table 1) was poured to the cocatalyst. The resulting suspension was directly introduced into a 10 L slurry autoclave.

(2) Polymerization of Ethylene

A 10 L slurry autoclave purged with nitrogen was charged with 5 L of isobutane, and 100 mg of IPRA (isoprenylaluminium) then the autoclave was pressurized with ethylene, the temperature was rised to 70° C. and the ethylene pressure was 40 bar-g.

The polymerization was started by injecting the catalyst and the polymerization was carried out for 90 minutes at 70° C. maintaining the ethylene pressure constant.

Polymerization activities are indicted in table 1.

TABLE 1

| Ex | (A-2) mg | TNOA-A mmol | Met. mmol | TNOA-B mmol | Activity g PE/g catalyst |
|---|---|---|---|---|---|
| 7 | 300 | 15 | 0.015 | 7.5 | 3500 |
| 8 | 200 | 10 | 0.01 | 5 | 5300 |
| 9 | 91 | 4.6 | 0.005 | 0.005 | 2747 |

Advantage of the Invention

According to the present invention, even when an ion-containing compound comprising a cation derived from a low cost amine and a non-coordinating anion is used, a solid cocatalyst component for olefin polymerization which can give an olefin polymer with a high polymerization activity and a catalyst for olefin polymerization to be obtained therefrom can be provided.

The invention claimed is:

1. A solid cocatalyst component for olefin polymerization, comprising an ion-containing compound comprising a cation expressed by $[R_4M]^+$ and a non-coordinating anion expressed by $[A]^-$, that is expressed by the following general formula (1):

$$[R_4M]^+ \cdot [A]^- \qquad (1)$$

wherein
the R groups, the same or different from one another, are each individually selected from the group consisting of a hydrogen atom and a substituted or non-substituted hydrocarbon group having from 1 to 30 carbon atoms with the exception of an aryl group; or two or more groups may form a ring by bonding with one another; at least one of the R groups is a $C_3$-$C_{20}$-cycloalkyl or $C_7$-$C_{20}$ arylalkyl radical; and M represents nitrogen;

$[A]^-$ has formula $[M^1(R^1)_a(R^2)_b(R^3)_c(R^4\text{-L})_d]^-$
wherein $M^1$ represents boron or aluminum;
$R^1$, $R^2$, and $R^3$ each individually represents a substituted or non-substituted hydrocarbon group having from 1 to 20 carbon atoms, an alkoxy group, a phenoxy group, or a halogen atom and may be the same or different from one another;
$R^4$ represents a hydrocarbon group having from 1 to 20 carbon atoms which may contain a hetero atom;
L is a silyl group having formula (3)

$$-[Si(Z^1Z^2)\text{-}Z^6\text{-}]_n SiZ^3Z^4Z^5 \qquad (3)$$

wherein
$Z^1$, $Z^2$, $Z^3$, $Z^4$, and $Z^5$ are each individually a member selected from the group consisting of a halogen atom, an alkoxy group, a phenoxy group, an acyloxy group and a hydrocarbon group having from 1 to 20 carbon atoms, and at least one of $Z^3$, $Z^4$, $Z^5$ is a halogen atom, an alkoxy group, a phenoxy group, or an acyloxy group;

$Z^6$ is a member selected from the group consisting of an oxygen atom, an imino group, an alkylene group having from 1 to 20 carbon atoms, an arylene group having from 1 to 20 carbon atoms, and an oxaalkylene group having from 1 to 20 carbon atoms; and n is an integer of from 0 to 10;

wherein the ion containing compound is chemically bonded to a fine particulate carrier.

2. The solid catalyst component according claim 1 comprising the product obtained by contacting:

a) an ion containing compound of formula (2):

$$[M^1(R^1)_a(R^2)_b(R^3)_c(R^4\text{-L})_d]^- \cdot [R^4M]^+ \qquad (2); \text{ and}$$

b) the fine particulate carrier;

wherein the ion containing compound a) is chemically tethered on the surface of the fine particulate carrier.

3. The solid cocatalyst component according to claim 1 wherein $R^1$, $R^2$, and $R^3$, equal to or different from each other, are halogen, halogenated $C_6$-$C_{20}$ aryl or halogenated $C_7$-$C_{20}$ alkylaryl groups; $R^4$ is a $C_6$-$C_{20}$ arylene or a $C_7$-$C_{20}$ arylalkylene radical optionally containing heteroatoms belonging to groups 13-17 of the periodic table of the elements.

4. The solid cocatalyst component according to claim 1 wherein $Z^1$, $Z^2$, $Z^3$, $Z^4$, and $Z^5$, equal to or different from each other, are halogen atoms, or a linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl or $C_7$-$C_{20}$-arylalkyl radical, optionally containing one or more oxygen atoms;

with the proviso that at least one of $Z^1$, $Z^2$, $Z^3$, $Z^4$, and $Z^5$ is an halogen atom.

5. The solid cocatalyst component according to claim 1 wherein n=0 and at least one of $Z^3$, $Z^4$, and $Z^5$ is a halogen atom.

6. A solid catalyst system comprising the product obtained by contacting:

(A) a solid catalyst component obtained by contacting:
(a-1) an ion containing compound of formula (2)

$$[M^1(R^1)_a(R^2)_b(R^3)_c(R^4\text{-L})_d]^- \cdot [R^4M]^+ \qquad (2)$$

wherein M represents nitrogen;

the R groups, the same or different from one another, are each individually selected from the group consisting of a hydrogen atom and a substituted or non-substituted hydrocarbon group having from 1 to 30 carbon atoms with the exception of an aryl group; or two or more groups may form a ring by bonding with one another; and at least one of the R groups is a $C_3$-$C_{20}$-cycloalkyl or $C_7$-$C_{20}$-arylalkyl radical;

$M^1$ represents boron or aluminum;
$R^1$, $R^2$, and $R^3$ each individually represents a substituted or non-substituted hydrocarbon group having from 1 to 20 carbon atoms, an alkoxy group, a phenoxy group, or a halogen atom and may be the same or different from one another;

$R^4$ represents a hydrocarbon group having from 1 to 20 carbon atoms which may contain a hetero atom;

L is a silyl group having formula (3):

$$-[Si(Z^1Z^2)\text{-}Z^6\text{-}]_n SiZ^3Z^4Z^5 \qquad (3)$$

wherein
$Z^1$, $Z^2$, $Z^3$, $Z^4$, and $Z^5$ are a each individually member selected from the group consisting of a halogen atom, an alkoxy group, a phenoxy group, an acyloxy group and a hydrocarbon group having from 1 to 20 carbon atoms, and at least one of $Z^3$, $Z^4$, and $Z^5$ is a halogen atom, an alkoxy group, a phenoxy group, or an acyloxy group;

$Z^6$ is a member selected from the group consisting of an oxygen atom, an imino group, an alkylene group having from 1 to 20 carbon atoms, an arylene group having from 1 to 20 carbon atoms, and an oxaalkylene group having from 1 to 20 carbon atoms; and n is an integer of from 0 to 10; and (a-2) a fine particulate carrier;

(B) a metallocene compound; and optionally (C) an organoaluminum compound.

7. A process for polymerizing at least one olefin of formula $CH_2=CHR^{11}$ wherein $R^{11}$ is a hydrogen atom or a $C_1$-$C_{20}$ alkyl radical optionally with a conjugate or non-conjugate diene comprising the step of contacting said olefins and optionally said diene under polymerization conditions in the presence of a catalyst system comprising the product obtained by contacting:

(A) a solid catalyst component obtained by contacting:

(a-1) an ion containing compound of formula (2)

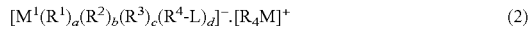

$$[M^1(R^1)_a(R^2)_b(R^3)_c(R^4\text{-}L)_d]^-.[R_4M]^+ \qquad (2)$$

wherein M represents nitrogen;

the R groups, the same or different from one another, are each individually selected from the group consisting of a hydrogen atom and a substituted or non-substituted hydrocarbon group having from 1 to 30 carbon atoms with the exception of an aryl group; or two or more groups may form a ring by bonding with one another; and at least one of the R groups is a $C_3$-$C_{20}$-cycloalkyl or $C_7$-$C_{20}$-arylalkyl radical;

$M^1$ represents boron or aluminum;

$R^1$, $R^2$, and $R^3$ each individually represents a substituted or non-substituted hydrocarbon group having from 1 to 20 carbon atoms, an alkoxy group, a phenoxy group, or a halogen atom and may be the same or different from one another;

$R^4$ represents a hydrocarbon group having from 1 to 20 carbon atoms which may contain a hetero atom;

L is a silyl group having formula (3):

$$\text{—}[Si(Z^1Z^2)\text{-}Z^6\text{-}]_nSiZ^3Z^4Z^5 \qquad (3)$$

wherein $Z^1$, $Z^2$, $Z^3$, $Z^4$, and $Z^5$ are each individually a member selected from the group consisting of a halogen atom, an alkoxy group, a phenoxy group, an acyloxy group and a hydrocarbon group having from 1 to 20 carbon atoms, and at least one of $Z^3$, $Z^4$, and $Z^5$ is a halogen atom, an alkoxy group, a phenoxy group, or an acyloxy group;

$Z^6$ is a member selected from the group consisting of an oxygen atom, an imino group, an alkylene group having from 1 to 20 carbon atoms, an arylene group having from 1 to 20 carbon atoms, and an oxaalkylene group having from 1 to 20 carbon atoms; and n is an integer of from 0 to 10; and (a-2) a fine particulate carrier;

(B) a metallocene compound; and optionally (C) an organoaluminum compound.

8. The process according to claim 7 wherein propylene is homopolymerized.

9. The solid catalyst component of claim 1 wherein at least one of the R groups is the $C_3$-$C_{20}$-cycloalkyl radical.

10. The solid catalyst component of claim 1 wherein at least one of the R groups is the $C_7$-$C_{20}$ arylalkyl radical.

11. The solid catalyst component of claim 1 wherein $[R_4M]^+.[A]^-$ is selected from N,N-dimethyl benzyl ammonium [4-(chlorodimethyl silyl)-2,3,5,6-tetrafluorophenyl] tris(pentafluorophenyl) borate, N,N-dimethyl benzyl ammonium [4-(dichloromethyl silyl)-2,3,5,6-tetrafluorophenyl] tris(pentafluorophenyl) borate, N,N-dimethyl benzyl ammonium (4-trichlorosilyl-2,3,5,6-tetrafluorophenyl) tris(pentafluorophenyl) borate, N,N-dimethyl benzyl ammonium [4-(chlorodimethyl silyl)-phenyl] tris(pentafluorophenyl) borate, N,N-dimethyl benzyl ammonium [4-(dichloromethyl silyl)-phenyl] tris(pentafluorophenyl) borate, N,N-dimethyl benzyl ammonium (4-trichlorosilyl phenyl) tris(pentafluorophenyl) borate, N,N-dimethyl cyclohexyl ammonium [4-(chlorodimethyl silyl)-2,3,5,6-tetrafluorophenyl] tris(pentafluorophenyl) borate, N,N-dimethyl cyclohexyl ammonium [4-(dichloromethyl silyl)-2,3,5,6-tetrafluorophenyl] tris(pentafluorophenyl) borate, N,N-dimethyl cyclohexyl ammonium (4-trichlorosilyl-2,3,5,6-tetrafluorophenyl) tris(pentafluorophenyl) borate, N,N-dimethyl cyclohexyl ammonium [4-(chlorodimethyl silyl)-phenyl] tris(pentafluorophenyl) borate, N,N-dimethyl cyclohexyl ammonium [4-(dichloromethyl silyl)-phenyl] tris(pentafluorophenyl) borate, or N,N-dimethyl cyclohexyl ammonium (4-trichlorosilyl phenyl) tris(pentafluorophenyl) borate.

12. The solid catalyst component of claim 11 wherein $[R_4M]^+.[A]^-$ is selected from N,N-dimethyl benzyl ammonium [4-(chlorodimethyl silyl)-2,3,5,6-tetrafluorophenyl] tris(pentafluorophenyl) borate, N,N-dimethyl benzyl ammonium [4-(dichloromethyl silyl)-2,3,5,6-tetrafluorophenyl] tris(pentafluorophenyl) borate, or N,N-dimethyl cyclohexyl ammonium [4-(chlorodimethyl silyl)-2,3,5,6-tetrafluorophenyl] tris(pentafluorophenyl) borate.

* * * * *